United States Patent [19]

Kaffen et al.

[11] Patent Number: 4,579,889

[45] Date of Patent: Apr. 1, 1986

[54] STABILIZED CATIONIC LATEX

[75] Inventors: Sharon L. Kaffen, Akron; Victoria A. Drexler, Hudson, both of Ohio

[73] Assignee: SCM Corporation, New York, N.Y.

[21] Appl. No.: 716,664

[22] Filed: Mar. 27, 1985

[51] Int. Cl.$^4$ .................. C09D 5/44; C09D 3/58
[52] U.S. Cl. .................. 523/414; 524/901; 204/181.7
[58] Field of Search .................. 523/414; 524/901; 204/181 C

[56] References Cited

U.S. PATENT DOCUMENTS

| | | | |
|---|---|---|---|
| 3,640,935 | 2/1972 | Abriss | 524/340 |
| 4,172,062 | 10/1979 | Sekmakas et al. | 524/901 |
| 4,198,495 | 4/1980 | Sekmakas et al. | 524/901 |
| 4,297,261 | 10/1981 | Jozwiak | 524/901 |

*Primary Examiner*—Ronald W. Griffin

*Attorney, Agent, or Firm*—A. Joseph Gibbons; Thomas M. Schmitz

[57] ABSTRACT

Mechanical stability and coating characteristics of structurally cation-active, film-forming latex, especially useful in electrodeposition coatings can be improved by the addition of small stabilizing amounts of linear cationic amine-modified epoxy resin having tertiary amine functionality and base number in the range of 30–500. Such stabilized latex remain substantially non-agglomerated even after being subjected to pumping and shear. The improved latex and process circumvent the purification steps, i.e. ion exchange and also ultrafiltration, often required treatments to render latex compositions suitable for electrodeposition coatings. The thickness of the film electrodeposited on the metal can be controlled by proper selection of the stabilizer amount and/or system voltage.

19 Claims, 3 Drawing Figures

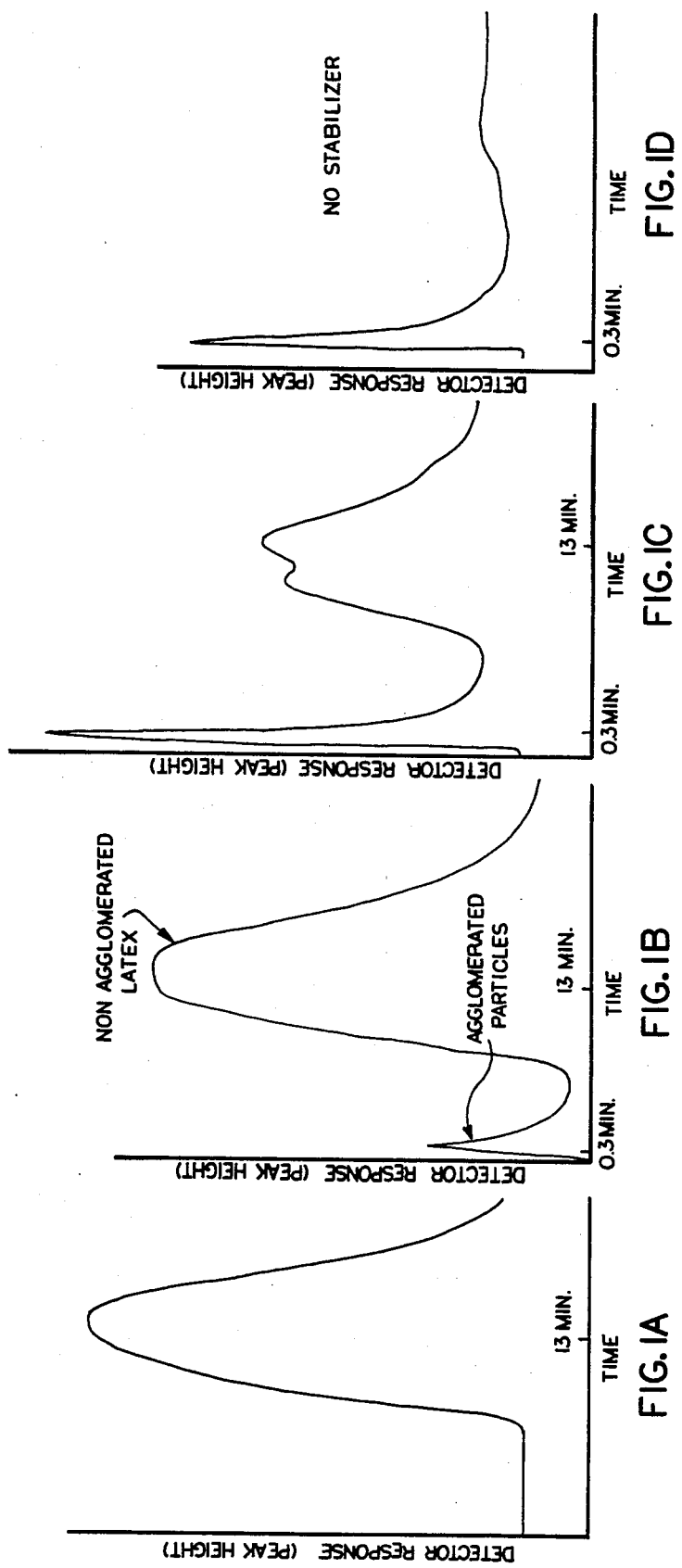

EFFECT OF STABILIZER/AMINE MONOMER ON LATEX STABILITY

STABILIZED CATIONIC LATEX

BACKGROUND OF THE INVENTION

The invention relates to improved cationic latexes useful in coatings and to a process for imparting mechanical stability to such latexes.

Although water-borne cathodic resin systems are well known, the use of latex binders in cathodic electrocoating is quite new and has not yet achieved full commercial acceptance. Copending application Ser. No. 513,621 filed July 14, 1983, now U.S. Pat. No. 4,512,860, gives background information on electrocoating latex for cathodic deposition and is incorporated herein by reference. The term "latex" is defined as a polymer or copolymer prepared from one or more monomers in an aqueous environment by emulsion polymerization techniques. Such latex, usually having an average particle size from about 800 Å to about 10,000 Å and an average molecular weight ranging from about 10,000 up to and above 1,000,000, is quite different from the water-reducible or ionizable polymers prepared, not in aqueous medium, but in solvent systems or neat. The latex water-reducible, cation-active polymers have been in commercial use for electrodeposition coatings for some time. Such conventional cationic latexes are known to be inherently less stable than their anionic counterpart systems.

For electrodeposition coatings, it is necessary to develop a latex that can be pumped and will be relatively insensitive to shear forces. Stability to shear is a necessary property for the latex itself, pigmented electrocoating compositions and for replenishment baths. In a commercial operation, the coating is continuously sheared by centrifugal pumping which passes the material through ultrafiltration membranes at a rate of 35-40 gallons/min. Instability of the coating, leading to agglomeration of particles after shear, causes fouling of the ultrafiltration membrane, application problems, and loss of coating properties. Such latexes tend to destabilize when subjected to shear forces and pumping processes. It is believed that destabilization is the result of a first-stage agglomeration of latex particles which, if uncontrolled, results in severe gellation. Gellation interferes with pumping and purification operations and usually interrupts the electrocoating process.

The closest art appears to be the coassigned patent application Ser. No. 716,665, filed Mar. 27, 1985. U.S. Pat. No. 3,640,935 (Abriss) teaches a method of improving latex stability by adding to the latex a non-ionic surface-agent (0.5–3%) as a solution in a water-soluble glycol. Heretofore a prepared latex was judged to be stable if it did not gel after thirty minutes in the Hamilton Beach shear test. It now appears this test is not critical enough to determine particle agglomeration and gelling tendency. A definitive shear test (HB/DCP) method to analyze latex stability was devised whereby the latex was evaluated using a disc centrifuge photosedimentometer (cf U.S. Pat. No. 4,311,039) following Hamilton Beach shear stress mixing for thirty minutes. This test more critically assesses the degree of latex particle agglomeration. It was found that often cationic latexes readily agglomerate when subjected to shear. Attempts to improve mechanical stability by increasing the cationic precursor amine monomer content or by the addition of conventional surfactants or additives, were insufficient to upgrade the latex to prevent severe agglomeration as determined by the new HB/DCP shear test method. Higher amine monomer level in the latex synthesis quite often diminishes latex conversion and increases dirt (coagulum) levels. In the instant invention, improved latex stabilization over that obtained by latex modification and conventional additives, has now been achieved by the addition of minor amounts of specific aminated epoxy resins to the cationic latex synthesized by emulsion polymerization.

BRIEF SUMMARY OF THE INVENTION

One object of the invention is to provide an improved electrocoating composition which comprises a major amount of a cationic latex prepared by emulsion polymerization in an aqueous medium and a minor amount of a substantially oxirane-free cationic resin adduct sufficient to impart mechanical stability to said latex and wherein said cationic latex and said cationic resin are at least partially neutralized with an inorganic acid or organic acid ionizer and wherein said cationic resin adduct is formed by reacting one or more epoxides with a polyamine having a plurality of primary amine linkages.

A further object is to provide an electrocoating process for preparing a stable cationic latex suitable for coating application having a major amount of cationic latex and minor stabilizing amount of a substantially neutralized cationic resin adduct which comprises:

a. preparing a cationic latex by emulsion polymerization in an aqueous medium in the presence of a surfactant;

b. forming an amine modified epoxy resin adduct by first reacting a lower molecular weight $C_{4-20}$ diamine with a multifunctional epoxide terminated polyether to produce an intermediate adduct having a residual amount of reactive N-H linkages suitable for further reaction with an epoxide and thereafter reacting the intermediate adduct with a $C_{3-20}$ epoxide in an amount sufficient to react substantially all the amino hydrogen linkages;

c. at least partially neutralizing said amine modified resin adduct with an inorganic or organic acid; and d. combining the cationic latex with said neutralized adduct to form a mechanically stable latex which can be used in electrocoating without further purification treatment.

BRIEF DESCRIPTION OF THE DRAWINGS

The invention may be better understood by having reference to the annexed drawings wherein.

FIG. 1 is a chart depicting particle size distribution of agglomerated and nonagglomerated latex as analyzed by the disc centrifuge method.

DETAILED DESCRIPTION OF THE INVENTION

Figure 2A:
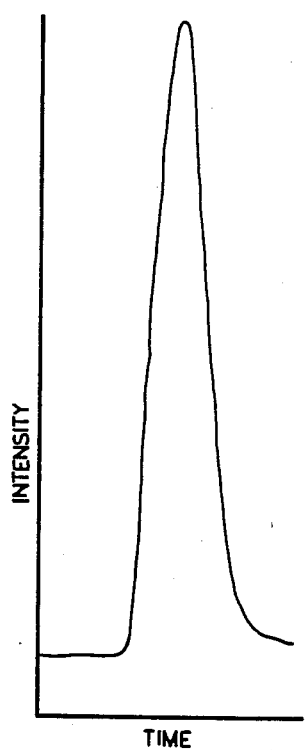
FIG. 2 is a chart depicting the effect of added stabilizer on mechanical stability of a relatively stable latex when subjected to shear.

The invention relates to a stabilized structured cationic latex useful in coating compositions and especially in electrodeposition coatings on a conductive substrate and to a process for preparing such latex having mechanical stability. Such latexes are preferably stabilized by the post-polymerization addition of specific amine modified resins added in an amount sufficient to prevent latex particle agglomeration which would normally result when the latex is pumped or subjected to shear forces. Such stabilized latexes can be used in electrocoating baths and in replenishment baths.

The cationic latexes which comprise a major portion of the improved coating composition useful in electrodeposition coating of substrate, particularly metal substrate, are prepared in an aqueous medium by emulsion polymerization of monomers having vinylic carbon-to-carbon unsaturation. Preferred latexes are described in application Ser. No. 513,621 noted above. These can include all-acrylic polymers and mixtures of acrylics with other monomer types such as unsaturated hydrocarbon monomers, i.e. styrene, vinyl toluene and the like.

The term "latex" is understood to comprise a polymer or copolymer prepared from ethylenically unsaturated monomers in an aqueous environment by emulsion polymerization. The resin binder particles in a latex advantageously have a particle size from about 400 to 10,000 Å and were preferably in the 1500–6000 Å range. A cationic latex is a latex having a salt-forming precursor component, capable of being ionized with an acid type reaction whereby the ionized salt portion helps to effect water dispersibility of the latex binder. When the salt-forming precuror, preferably a primary, secondary or tertiary amine portion, is part of the polymeric chain then such latex are said to be structurally cation active. When the cation portion is merely added as a nonpolymeric unit, the latex is said to be cation active by the fact that amino and other positively charged ions reside on the surface of the polymer particle. These non-structural types are not deemed to be structurally cation active.

The vinyl monomers most useful in forming the structured cationic latex include esters of acrylic and methacrylic acid, for example methylmethacrylate, ethylmethacrylate, 2-ethylhexylmethacrylate, butylacrylate, isobornyl acrylate, isobutyl methacrylate and the corresponding hydroxy acrylates, e.g. hydroxy ethyl acrylate, hydroxypropyl acrylate; also the glycol acrylates; allyl acrylates; and epoxy acrylates. Other suitable vinyl monomers include vinyl acetate, vinyl and vinylidenes halides, e.g. vinyl chloride, vinylidene chloride; amides such as methacrylamide and acrylamide; hydrocarbons such as butadiene, styrene, vinyl toluene and the like.

For structured cationic latex, additional vinyl monomers having base functionality are required in weight percentages of about 0.10 to 35% basis total monomer content. Amino groups are preferably incorporated in the vinyl monomers by using tertiary, secondary or primary amino functional acrylates, methacrylates and acrylamides such as for example dimethylaminoethyl methacrylate or acrylate, or dimethylaminopropyl acrylamide or methacrylamide. Such amine functional monomers are copolymerized in an aqueous system to build an amino functionality into the acrylate polymer which, when partially or fully neutralized with an ionizer, impart the cationic properties to the acrylic latex.

Ionizers for the structured cation-latex can be selected from organic carboxylic acids, e.g. lactic, acetic, or from mineral acids such as hydrochloric acid, phosphoric acid, sulfuric acid or the like.

Ionizers for the epoxy-amine stabilizers can be the same or different ionizers as selected for the cationic latex. Phosphoric acid is a preferred ionizer for the latex preparation and lactic acid is preferred for the ionization of the epoxy-amine stabilizers especially when the amine-adduct is post-added after the main emulsion polymerization of vinyl monomers to form the cationic latex. An alternate less preferred approach is the combining of the amine-adduct prior to or during the latex polymerization step.

The structured cation-active latexes prepared by emulsion polymerization in an aqueous medium are preferably stabilized by the post-polymerization addition of specific amine modified resins added in an amount sufficient to prevent latex particle agglomeration which would normally result when the latex is pumped or subjected to shear forces. Useful amine epoxy adducts for the stabilization of major amounts of cationic latex using a minor amount of stabilizer, generally used in the order of 0.5 to 25 and preferably below 15 percent by weight basis latex solids, include the resin adducts known in the art and exemplified in various patents as for example U.S. Pat. Nos. 4,423,166; 4,421,620; 4,420,574; 4,419,468; 4,419,467; 4,416,753; 4,403,050; 4,396,732; 4,376,848; 4,376,687; and 3,984,382; all of which are incorporated herein by reference, and many other art recognized adducts. Typically, such adducts will be derived from diamines reacted with an extended polyether and one or more epoxy compounds, usually by sequential reactions, as for example, polyethers, epoxy extended polyethers, and alkylene epoxides which contain from about three to about 24 carbon atoms such as the mono olefin epoxides. Especially preferred are the polyether epoxides derived from bisphenol A and particularly the dispersions exemplified in U.S. Pat. No. 4,159,233, incorporated herein by reference. Specifically these are liquid dispersions comprising (a) a substantially oxirane-free precursor adduct of a polyether diepoxide having a molecular weight of from about 350 to 10,000 and preferably from about 350 to 1500, and a polyamine having a molecular weight from about 60 to 600; said precursor adduct is next reached with (b) a mono-epoxide having molecular weight from 100 to 500 and having a normal alkyl group of at least about 4 carbon atoms pendant through only hydrolysis-resistant linkages from the epoxy group of said mono-epoxide, the mole ration of residues of said polyamine to residues of said diepoxide in said resinous adduct being from about 1.25:1 to 2:1, and said polyamine having from 2 to 5 amine groups per molecule and at least sufficient amino hydrogens to react with substantially all of the epoxy groups of both said diepoxide and said mono-epoxide. Where crosslinking agents are necessary, the dispersion can additionally contain a small amount, usually from about 0.05 to 3.0 weight percent, based on said resinous adduct, of an aminoplast resin. The term aminoplast resin includes melamine, benzoguanamine-formaldehyde adducts as well as alkylated and hydroxyalkyl glycolurils.

As noted above, a wide variety of compounds can act as amine adduct stabilizers for latex stabilization. The preferred amine modified resin stabilizers are schematically illustrated by the formula:

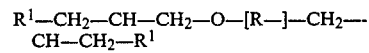

where $R^1$ can be the same or different moiety representing a diamine substituent with tertiary amine functionality reactable with hydrogen acids, organic carboxylic acids or quaternary-former halides to produce respectively dispersible acid salts or quaternary compounds; R is a diradical derived from either an aliphatic or aromatic polyol. When the polyol is an aromatic polyol, bisphenol A is a preferred starting material for the preparation of the amine modified resin. For example, bisphenol A is reacted with epichlorohydrin to obtain a bisepoxide which is then reacted with the diamine moiety. Preferably, the reaction of the diamine with the bisepoxide is conducted in such ratio such that a substantial amount of reactive-NH groups remain for further reaction with a monoalkyl epoxide, such as for example a $C_4$–$C_{24}$ olefin epoxide. The total reaction of the amine with the epoxy is preferably brought to completion so that substantially all of the epoxide groups have been reacted to form the corresponding alcohol and generate a new carbon to nitrogen linkage.

Referring to the ionization or salt formation, almost any acid sufficiently strong to ionize amine groups on the polyamino polyhydroxy polyether resinous adduct can be employed as the neutralizing acid. Since an acid with $pK_a$ of about 5 or less will ionize a significant proportion of most amine groups, most carboxylic organic acids will produce a satisfactory degree of ionization of the resinous adduct, but it is usually more convenient if the acid selected is itself at least moderately soluble in water. It is frequently desirable that the acid be relatively volatile so that any portion thereof deposited as part of the uncured film will tend to be fugitive upon heating the film to effect cure. Lactic acid is a particularly preferred acid, but many other organic carboxylic acids may be used. Inorganic acids, such as hydrochloric, sulfuric and phosphoric, may also be used.

Useful diamine substitutents, are preferably those derived from lower molecular weight aliphatic diamines as for example, N,N-dimethylamino ethyl amine; N,N-diethylamino ehtylamine; N,N-dipropylamino ethylamine; N,N-dimethylamino butylamine; N,N-diethyl geranylamine; N,N-dimethyl hexylamine; N,N-diethyl octylamine; N-cyclohexyl-N-ethylamino ethylamine; N-cyclopentyl-N-ethylamino propylamine; N,N-dimethylamino-$N^1$-methylamino propane. It is preferred to react substantially molar equivalent amounts of amine and epoxide in the formation of the stabilizer adduct so that there will be neither an excess of free amine nor a substantial excess of epoxide in the stabilizer. When the adduct is prepared using excess amine, an unreacted amine monomer should be removed by conventional methods. An alternate approach is to form the stabilizer adduct using an excess of the epoxide so that the amine component is full reacted. In this case a slight excess of the partially unreacted epoxide will not be detrimental to the latex composition.

One advantage of the stabilizer adducts is that the reaction of the diamine with the epoxide splits the epoxide and produces a free hydroxy group two carbon atoms removed from the newly formed carbon-nitrogen linkage. After neutralization or salt formation with the inorganic acid, organic acid or quaternary-former halide, the adduct stabilizer added to the vinyl latex provides both charge stabilization of the latex (external not buried) and additionally provides reactive hydroxy functionality for use in crosslinking cures when needed.

The amine modified resins are effective in stabilizing various latexes including the cationic latexes described in U.S. application Ser. No. 513,621 referenced above, which application is incorported herein by reference. Although these synthetic latexes are aqueous acrylic and acrylic/styrene based compositions for application to metal surfaces by cathodic electrodeposition, the invention is not restricted to a particular type of latex. Desirable latexes are cationic latexes and preferably acrylic latexes. The best mode examples exemplify an acrylic latex. This latex, before post addition of stabilizer passes the 30-minute Hamilton Beach stability test. If the sample is then diluted and analyzed using the disc centrifuge photosedimentometer, it is observed that the primary particles of the latex have agglomerated into much larger particles which are unsuitable for the latex application. Acrylic latexes are prepared by emulsion polymerization as exemplified in U.S. application Ser. No. 513,621. These can contain small amounts of blocked isocyanotoethyl methacrylate and aminoalkyl acrylates for generation of the cation portion of the latex.

Although not wishing to be bound thereby, it is believed that the particular amine-adduct stabilizers function in part to stabilize the latex and in part to modify the effect of residual lower molecular weight monomers, especially amine monomers, and ionic fragments, derived in part from the catalysts used for emulsion polymerization, all of which are deleterious to the latex and coating derived therefrom. The adduct in one sense contributes to the latex ionicity and in a further sense appears to moderate the undesired species which are detrimental to good film deposition.

The need for purification of electrocoating baths has been known for some time. In U.S. Pat. No. 3,575,909, Gilchrist teaches high solids electrocoating baths and replenishment compositions usually associated with anodic electrodeposition.

U.S. Pat. No. 4,222,837 (Hazan) teaches a method of purifying cathodic electrocoating baths where the excess phosphoric acid build up is controlled by ultrafiltation. Ultrafiltration is needed to control the level of acid and other water-soluble materials in the electrodeposition bath.

As noted above, application Ser. No. 513,621 teaches an improvement using ion exchange techniques to treat the new latex systems prepared by emulsion polymerization of monomers in an aqueous environment and having cation active groups supplied by nitrogen containing monomers. By such treatment "amino" fragments, and low molecular weight monomers, are rendered non-conflicting with good electrocoat systems. In the present invention using specific stabilizers, latex systems can be used in electrocoating processes without prior ion exchange purification or other type of cleaning to remove ionic contamination.

Hamilton Beach Test. The latex was strained through a 50 mesh sieve and an amount sufficient to contain 100 grams solids was weighed into a 24-ounce milkshake cup. Two grams defoamer was added and the sample was mixed for 30 minutes using the medium setting of Hamilton Beach Milkshake Mixer Model No. 30. The sample was removed and its consistency noted, i.e. fluid, paste, dilatent, solid, etc. An average of three runs was used.

Agglomeration Test.

The disc centrifuge photosedimentometer (DCP) is known to be useful for determining particle size and particle size distribution for latex emulsions and other polymer systems (cf U.S. Pat. No. 3,475,968 and U.S. Pat. No. 4,311,039). The same concept, namely forcing particles under high centrifugal force radially outward through a spin fluid or medium, is readily adaptable for the evaluation of particle agglomeration of the instant latex composition. Since larger particles traverse the medium faster (seconds) than do those of smaller (minutes) particle size. Optical analysis of the exiting particles provide a trace similar to these shown in FIG. 1. FIG. 1A represents a non-agglomerated latex having a single peak exiting at about 13 minutes. As the latex agglomeration increases, the 13-minute peak decreases and a new peak representing large particle size agglomerated particles becomes evident at an exit time of about 20 seconds. As indicated in FIG. 1D a fully agglomerated latex shows essentially only one peak at 20 seconds. All tests were run at disc centrifuge speeds of 3586 rpm using dilute non-ionic surfactant solution as spin medium. The ration of peak heights occurring at 13 minutes and 20 seconds can be used quantitatively to access particle agglomeration. An infinite ration (FIG. 1A) denotes no agglomeration while a ration approaching zero (FIG. 1D) denotes total agglomeration. Peak height ratios of less than 10 (FIG. 1C) will typically be unsatisfactory for electrocoating purposes.

Shear or mechanical stability of a latex or latex paint is defined as the lack of substantial particle agglomeration in a disc centrifuge photosedimentometer trace after subjecting said latex or paint to a period of stress mixing for at least 30 minutes (i.e. Hamilton Beach mixer).

The term "major portion" or "major amount" means in excess of 50 weight percent unless otherwise specified.

The term "minor portion" or "minor amount" means less than 50 weight percent of the entity referred to unless otherwise specified.

The following illustrative Examples should not be narrowly construed. Unless otherwise indicated parts and percentages are by weight and temperature is given in degrees Centigrade.

EXAMPLE 1

An all-acrylic cation-active latex was prepared by emulsion polymerization in an aqueous medium by the method shown in U.S. patent application Ser. No. 513,621 filed July 14, 1984 from the following components mixed in the order indicated:

| Group | Ingredients | Parts per 100 parts of Monomer |
|---|---|---|
| A | Deionized Water | 88.37 |
| | Triton X-405* | 0.30 |
| | $H_3PO_4$ (85.6% solution in water) | 0.146 |
| B | Butyl Acrylate (BA) | 1.48 |
| | Methyl Methacrylate (MMA) | 2.52 |
| C | Deionized Water | 3.47 |
| | AAP[a] | 0.1 |
| D | BA | 47.47 |
| | MMA | 27.47 |
| | Methylethyl Ketoxime-blocked 2-Isocyanato-Ethyl Methacrylate (B-IEMA) | 11.00 |
| | Hydroxypropyl Methacrylate (HPMA) | 9.86 |
| | 2-Mercaptoethanol (HONSH) | 1.10 |
| | 2-Dimethylaminoethyl Methacrylate | 0.20 |
| E | Deionized Water | 9.76 |
| | AAP[a] | 0.20 |
| | Triton X-405* | 1.31 |
| F | Dowcil 75** | 0.05 |
| | Deionized Water | 0.25 |

[a]2,2'-azobis (2-amidino propane hydrochloride)
*The trademark of Rohm and Haas Company for the nonionic surfactant, ethoxylated octylphenol having an average of 40 moles of ethylene oxide per mole of the phenol.
**A Biocidal additive from Dow Chemical Company The latex exhibited an average particle size (weight average) of ca 5200 Å determined by turbidity (disc centrifuge) measurement. Mechanical stability was determined by subjecting the latex to shearing agitation (Hamilton Beach Test) and agglomeration was determined using the disc centrifuge photosedimentometer. This latex was unsuitable for electrodeposition. As shown in Table I this latex was thickened badly when shear tested using the Hamilton Beach test method and was totally agglomerated using the HB/DCP Agglomeration Test. The agglomeration trace is shown as FIG. 1D.

EXAMPLE 2

Preparation of Amine-Adduct Stabilizer

A polyamino polyhydroxy polyether resinous adduct emulsion was prepared according to the procedure indicated in U.S. Pat. No. 4,159,233.

Dimethylaminopropyl amine (DMAPA 102) (8.52 mole parts) were mixed with 41 weight parts of xylene and heated to reflux under an inert atmosphere. To this mixture was gradually added over a period of about two hours 5,439 weight parts of Dow epoxy resin DER-671 having a molecular weight of about 1,050 (5.18 mole parts), while maintaining reflux. The reflux was continued for about two additional hours or as long as necessary to consume substantially all the oxirane functionality of the epoxy resin. The temperature of the mixture was then gradually raised to about 365° F. while removing xylene and excess amine as distillate. Most of the residual solvent and unreacted DMAPA was removed from the mixture by applying vacuum of about 24 inches of mercury while maintaining the temperature of about 365° until the distillation rate was nil. Then the temperature while 500 weight parts (1.87 mole parts) of a 16 carbon atom α-olefin epoxide (Union Carbide) was gradually added over a period of about one hour and at least for an additional 30 minutes so that the monoepoxide will fully react with the aminated precursor adduct. Finally, 3,151 weight parts of 2-butoxy ethanol was stirred in. The product solution was about 62 percent by weight non-volatiles and the resinous adduct producted has base number of about 130, corresponding to a mole ratio of DMAPA to diepoxide in the product resinous adduct of about 2:1.

The amine-adduct was neutralized by stirring with 1:1 molar ratio of lactic acid (88.5% solution in water) at room temperature.

EXAMPLES 3–9

Preparation of Stabilized Latex

Figure 2B:
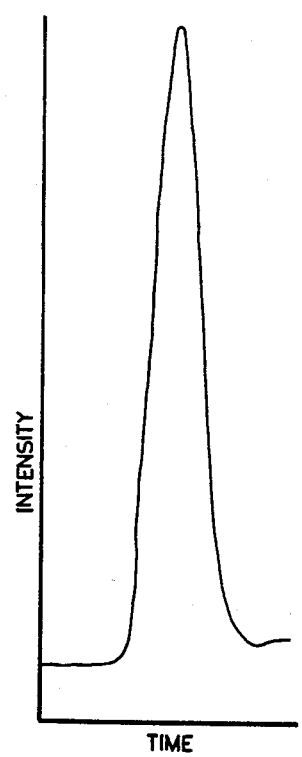
Figure 2C:
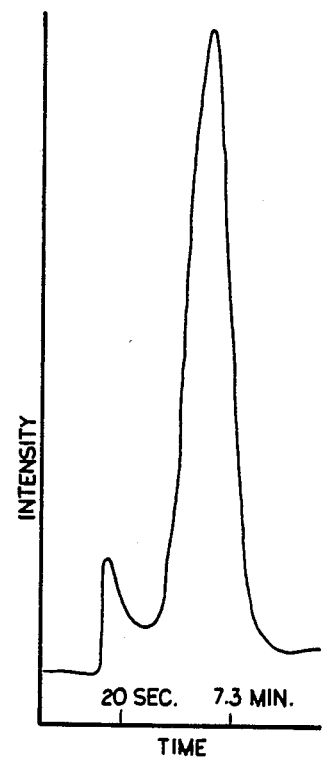

The latex prepared according to Example 1 was divided into 200-gram aliquots. To each aliquot was added a quantity of epoxy-amine adduct prepared according to Example 2 with moderate stirring and then stirred for 30 minutes and allowed to equilibrate overnight. The compositions, given in Table I, were tested for mechanical stability using the Hamilton Beach test and the HB/DCP test (agglomeration). As shown in Table I all of the samples, except the Control, did not thicken and remained fluid in the Hamilton Beach test. In the Agglomeration test the Control sample was totally agglomerated. Samples with amine adduct additive above 6.0 percent showed no agglomeration with quite marked agglomeration at 2.0 percent and below. The results of the agglomeration test following 30 minutes shear on the mixer are shown in FIG. 1. The latex stabilized with 13.6% amine adduct exhibits only one peak at about 13 minutes time (FIG. 1A). As the amount of stabilizer additive decreases the sheared latex exhibits increasing agglomeration as noted by the appearance of a new peak at about 0.3 minute and corresponding decrease in the 13-minute peak height (FIGS. 1B and 1C).

spectively with the control (FIG. 2C - no additive). It is seen that the agglomeration peak at 20 seconds in the control has disappeared in the stabilized compositions. In the stabilized samples only one peak is seen at 7.3 minutes. This peak has not shifted position indicating no change in particle size with shear.

TABLE I
MECHANICAL STABILITY TESTS

| Example No. | Amine/Adduct (Wt. % Basis Total Resin) | Hamilton Beach | Agglomeration HB/DCP | Peak Ratio |
|---|---|---|---|---|
| 3 | 0 | Thickens | Total | 0 |
| 4 | 1.8 | Pass | Severe | 0.1 |
| 5 | 3.7 | Pass | Moderate | 0.6 |
| 6 | 5.5 | Pass | Slight | 2.8 |
| 7 | 7.3 | Pass | Very Slight | 13.7 |
| 8 | 13.6 | Pass | None | — |
| 9 | 24.0 | Pass | None | — |
| 11A | 0 | Pass | Slight | 5.5 |
| 11B | 0 | Pass | Slight | 6.0 |
| 11C | 0.9 | Pass | None | — |
| 11D | 3.7 | Pass | None | — |
| 11E | 5.5 | Pass | None | — |
| 12A | 0 | Pass | Total | 0 |
| 12B | 7.3 | Pass | Very Slight | 17 |

The control with no additive is completely agglomerated-exhibits essentially a single peak at 0.3 minute time with only a trace indication of the original peak at 13 minutes (FIG. 1D).

EXAMPLE 10

In a separate test the epoxy/amine adduct prepared as in Example 2 and neutralized with lactic acid was added at 7.3% weight percent at various stages during the emulsion polymerization of the latex. As seen in Table II, the finished latex was stable and of good quality when the stabilizer adduct was added during or after the polymerization. Stability was determined using the Agglomeration Test.

TABLE II

| Example No. | Point When Amine-Adduct Added | Particle Size Å | Stability* | Latex Appearance (Conversion, Grit Level) |
|---|---|---|---|---|
| 10A | End of Heel Reaction | 10,000 Å | Poor | Poor |
| 10B | Half Way Through Monomer Feed | 5800 Å | 100% | Very Good |
| 10C | End of Feed (Hot Blend) | 5700 Å | 100% | Good |
| 10D | After Reaction Cool Down | 5800 Å | 100% | Very Good |

*Agglomeration Test Method

EXAMPLE 11

A similar all-acrylic latex was prepared using the procedure of Example 1 except that the amino monomer, dimethylaminoethyl methacrylate was increased to 2.0 parts per hundred parts monomer with corresponding adjustment of phosphoric acid and the amine-/adduct was added at various concentration ranging from zero to 7.3 percent (basis latex solids). Agglomeration tests were run after shearing each sample for 30 minutes on the Hamilton Beach mixer. The stability for these compositions, designated 11A–11E, are shown in Table I. The amine/adduct is effective in imparting mechanical stability to the latex at 1.8 parts adduct and above. Experiments 11A and 11B, with no additive, serve as controls. Although this latex is more stable than Example 1 latex, agglomeration is clearly shown in the control experiments 11A and 11B. FIG. 2 photosedimentometer traces allows one to compare the non-agglomerated samples 11C and 11D (FIGS. 2A and 2B) containing epoxy additive at 1.8, and 3.7, percent re-

EXAMPLE 12

Small-Particle Size Styrene/Acrylic Latex

A lower particle size styrene/acrylic cation-active latex was prepared using the procedure of Example 1 from the following components

| Group | Ingredients | Parts per 100 Parts of Monomer |
|---|---|---|
| A | Deionized Water | 139.04 |
|   | Triton X-405 | 0.15 |
|   | Phosphoric Acid (20%) | 0.624 |
| B | Butyl Acrylate (BA) | 0.74 |
|   | Methyl Methacrylate (MMA) | 1.26 |
| C | Deionized Water | 4.19 |
|   | AAP | 0.10 |
| D | BA | 50.46 |
|   | MMA | 18.69 |
|   | Styrene | 20.00 |
|   | Hydroxypropyl Methacrylate (HPMA) | 8.65 |
|   | 2-Dimethylaminoethyl Methacrylate (DMAEMA) | 0.20 |
|   | n-Dodecyl Mercaptan (n-DDM) | 0.20 |
| E | Deionized Water | 8.54 |
|   | AAP | 0.20 |
|   | Triton X-405 | 1.37 |

The latex had a non-volatile content of 38.45% and particle size (weight average) of 3300 Å.

The epoxy-amine adduct of Example 2 was post added to the latex at 7.3 percent (basis total resin solids). The latex was a blend of three latexes synthesized by the procedure of Example 12. The stabilized latex was allowed to equilibrate overnight before testing agglomeration by the HB/DCP method. An unstabilized control having no additive was compared with the stabilized latex. The unstabilized latex was totally agglomerated whereas only slight agglomeration was noted for the stabilized sample. The bimodal nature of the original latex remained intact in the stabilized latex whereas it disappeared in favor of the agglomeration peak (20 seconds) is the unstabilized sample subjected to shear.

Heretofore, small particle size latex (2500–3500 Å) showed good coating characteristics and dry film properties but were quite unstable to shear forces. This experiment shows that mixed systems prepared at lower particle size can indeed be shear stabilized by addition of epoxy-amine stabilizer.

EXAMPLE 13

Figure 3:
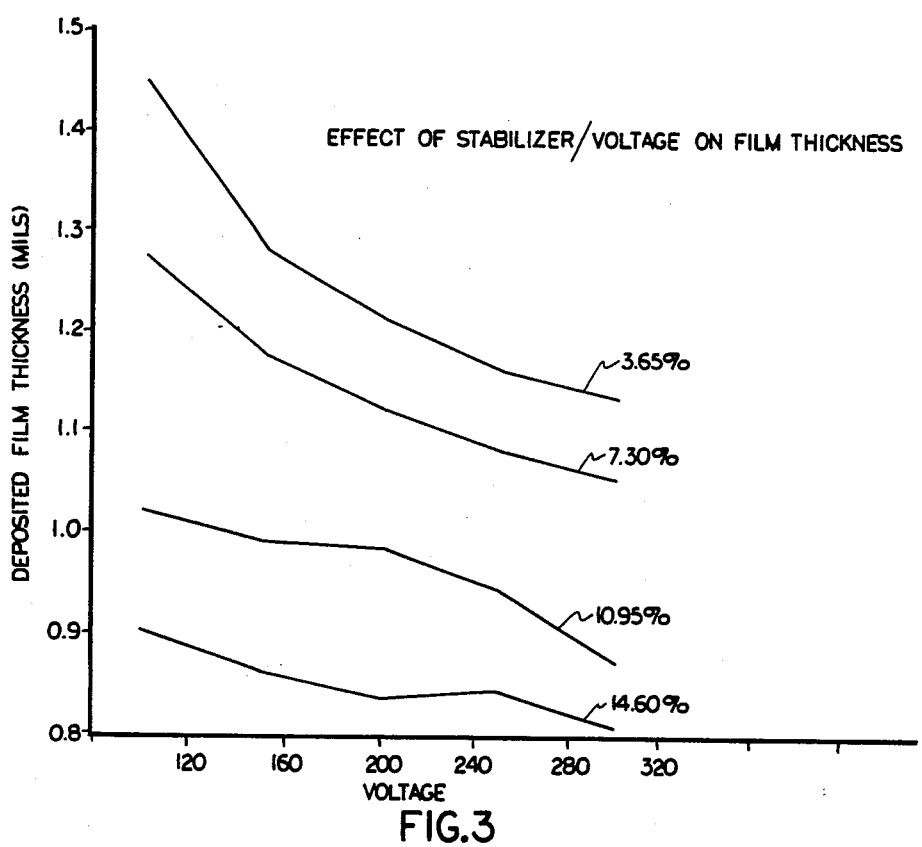
FIG. 3 is a chart showing deposited film thickness in a stabilized latex when electrodeposited at various voltage levels.

A cation-active latex similar to that of Example 1 was stabilized by mixing 0, 3.65, 10.95, and 14.60 parts of the epoxy/amine adduct of Example 2 per hundred parts (solids) latex using a motor driven agitator. the composition was reduced to 5% NV with deionized water. A series of panels (ironphosphated steel, 4 in. ×4 in.) were electrocoated at 25° C. over the range 100 V to 25 V using 50 V increments. The latex without stabilizer adduct did not electrocoat without further purification (i.e. ion-exchange). In contrast all stabilized latex samples electrocoated without ion-exchange treatment. Excellent shutdown (zero current) was obtained up to 400 V without rupture using a 64-second duration. Film thickness ranged from 0.8–1.5 mil as seen in Table III. This data is depicted graphically in FIG. 3. As seen, film thickness can be controlled by adjusting voltage or stabilizer level.

TABLE III
FILM THICKNESS (MIL) VS VOLTAGE ELECTRODEPOSITION (25° C.)

| Experiment No. | Level Epoxy/Amine Adduct* | Deposited Film Thickness (Mils) (Voltage) | | | |
| --- | --- | --- | --- | --- | --- |
| | | 100 | 150 | 200 | 250 |
| 13A | 0 | No Coating** | | | |
| 13B | 3.65 | 1.45 | 1.28 | 1.21 | 1.16 |
| 13C | 7.30 | 1.28 | 1.18 | 1.12 | 1.08 |
| 13D | 10.95 | 1.02 | 0.99 | 0.98 | 0.94 |
| 13E | 14.60 | 0.90 | 0.86 | 0.84 | 0.84 |

*Parts per hundred parts polymer
**Did not electrocoat

What is claimed is:

1. A latex composition which comprises a major amount of structured cation-active latex formed by emulsion polymerization of various vinyl monomers in an aqueous medium and a minor amount of from about 0.5 to 25 weight percent basis latex solids of a substantially oxirane-free, cationic resin adduct sufficient to impart mechanical and shear stability to said latex; wherein said cationic resin adduct is an amine-modified epoxy resin salt resulting from the reaction of an oligomer selected from the group consisting of polyether, polyester, polyamide, polyepoxide, or polyamine or mixtures thereof having at least one reactive epoxide ring with an amine having at least one amino hydrogen capable of reacting with said epoxide to form said adduct; wherein said oligomer has a molecular weight of from about 400 to 1,500; said resin and said adduct are at least partially neutralized with an inorganic or organic acid; and wherein the stability of said latex is evidenced by the lack of substantial particle agglomeration in a disc centrifuge photosedimentometer trace after subjecting said latex to stress mixing for a period of at least 30 minutes.

2. The composition according to claim 1 wherein the resin oligomer is a polyether epoxide added in an amount of from about 2.0 to about 12 weight percent basis total resin solids.

3. The composition according to claim 1 wherein the cationic resin adduct is a dispersion of the reaction product of a diamine reacted in part with a multifunctional epoxy terminated polyether and in part with an $C_{4-20}$ alkyl monoepoxide.

4. The composition according to claim 3 wherein the diamine is dimethylaminopropylamine, which is first partially reacted with bisphenol A derived polyether epoxide, and then further reacted with an α-olefin epoxide and the said resin is neutralized with an organic acid.

5. The composition according to claim 3 wherein the cationic latex is an acrylic resin having cationic functionality derived from an amino containing monomer copolymerized in the preparation of said latex by emulsion polymerization in an aqueous environment with one or more esters selected from the gorup consisting of acrylic acid esters and methacrylic acid esters.

6. The composition of claim 5 wherein the said latex is a copolymer containing acrylate and/or methacrylate monomer units, monomer units having secondary and-/or tertiary amino functionality, and/or vinyl unsaturated hydrocarbon monomers and hydroxyalkyl acrylate or methacrylate monomers.

7. The composition of according to any one of claims 4–6 which further includes particulate material in the nature of pigment, filler, plastic pigment and/or powder paint particles.

8. The composition of claim 6 which further includes crosslinking agents adapted for reaction with said hydroxy functional acrylate or methacrylate monomers.

9. A process for preparing a mechanically stable cationic latex suitable for coating application having a major amount of cationic latex and a minor stabilizing amount of a substantially neutralized cationic resin adduct which comprises:
   a. forming a cationic latex by the emulsion polymerization of vinyl monomers in an aqueous medium;
   b. forming an amine-modified epoxy resin adduct by first reacting a lower molecular weight $C_{4-20}$ diamine with a multifunctional epoxide terminated polyether to produce an intermediate adduct having a residual amount of reactive N—H linkages suitable for further reaction with an epoxide and thereafter reacting the intermediate adduct with a $C_{3-20}$ alkyl epoxide in an amount sufficient to react substantially all the amino hydrogen linkages;
   c. neutralizing said amine-modified resin adduct with an inorganic or organic acid;
   d. combining the cationic latex with said neutralized adduct in an amount sufficient to stabilize the latex.

10. A method of electrocoating an electrically conductive surface serving as a cathode in an electrical circuit comprising said cathode, an anode, and an aqueous electrodepositable composition wherein the electrodepositable composition comprises the composition which comprises passing an electric current between said cathode and anode and of any one of claims 1,3–5 or 6.

11. The method of claim 10 wherein said latex is a copolymer derived from acrylate and/or methacrylate monomer units, monomer units having secondary and-/or tertiary amino functionality, and/or vinyl unsaturated hydrocarbon monomers and hydroxyalkyl acrylate or methacrylate monomers.

12. An article coated by the method of claim 10.

13. A cathodic electrocoating bath comprising a composition of claim 1 which contains protic acid ionizing agent and up to about 30% binder solids comprising said latex and said resin adduct.

14. A replenishment composition for the bath of claim 13, said replenishment composition being like that of said bath except that it is richer in latex binder solids and leaner in ionizing acid than said bath.

15. The method of claim 11 wherein said electrodepositable composition further includes particulate material in the nature of pigment, filler, plastic pigment and/or powder paint articles.

16. A coating composition suitable for deposit on a metal substrate by electrodeposition comprising a cationic latex and a minor amount of from about 0.5 to about 25 weight percent, basis latex solids of one or more amine resin adduct selected from the group consisting of polyether-amine, polyether epoxy-amine, polyamide, polyamine, and mixtures thereof sufficient to impart mechanical stability to said latex and wherein the amine resin and said latex are at least partially neutralized with a protonic acid wherein said amine adduct are effective agents for removing, complexing or otherwise fixing lower molecular amine monomers, ions or fragments which are residual in the latex following latex preparation by polymerization of monomers in the presence of amine monomers and free radical catalysts and detrimental to the electrocoating process.

17. A process for improving the electrodeposition of film-forming, cation-active, amino-stabilized latex containing a minor proportion of cation-active low molecular weight substance which comprises contacting said low molecular weight substance in said latex with a substantially oxirane-free amine resin adduct of claim 1 having a Base No. of from about 30 to about 500.

18. A process for controlling film thickness of emulsion polymerized cathodic latex electrocoated on metal substrate which comprises adding to said latex from about 1.0 to about 15.0 weight percent, basis latex solids of cationic resin adduct of claim 1.

19. The process of claim 18 which comprises varying the voltages of the electrocoating system and stabilizer content to control film thickness on the electrocoated metal substate.

* * * * *